Oct. 14, 1924.                                                    1,511,331
R. HARRIS
MOTOR SLEIGH
Filed Dec. 2, 1922                         4 Sheets-Sheet 4
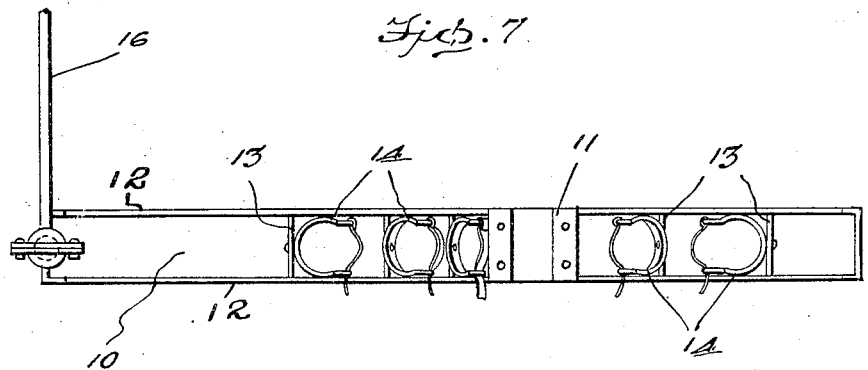
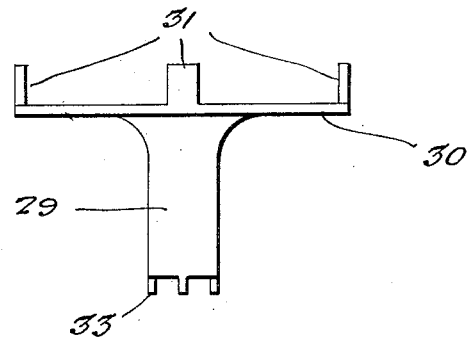
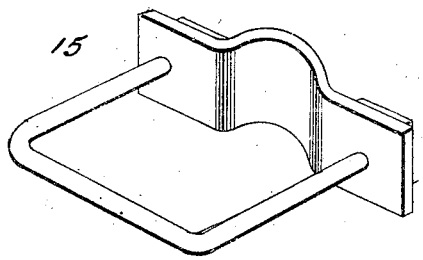
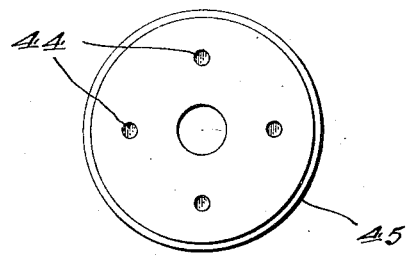
R. Harris, INVENTOR
BY Victor J. Evans, ATTORNEY
WITNESS:

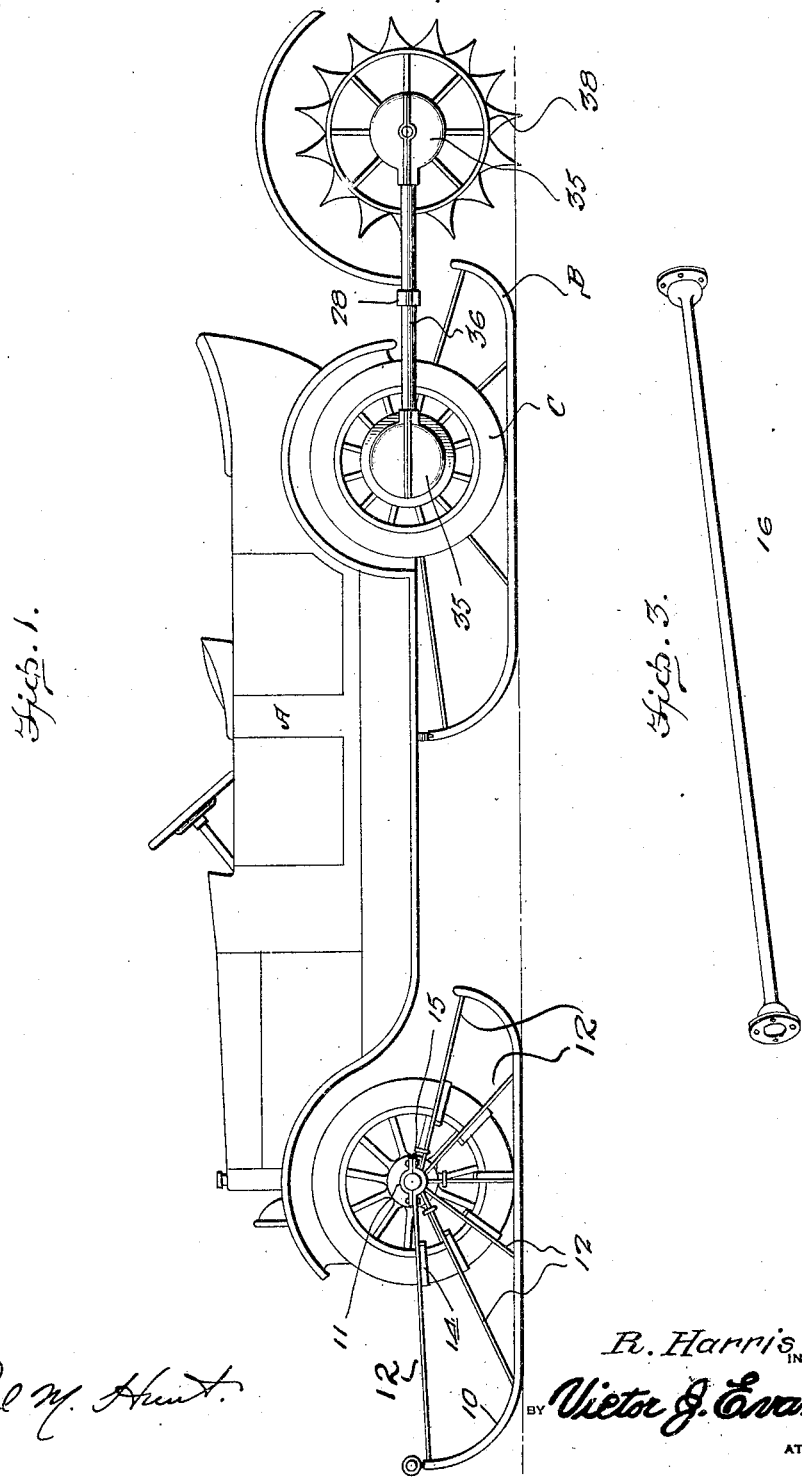

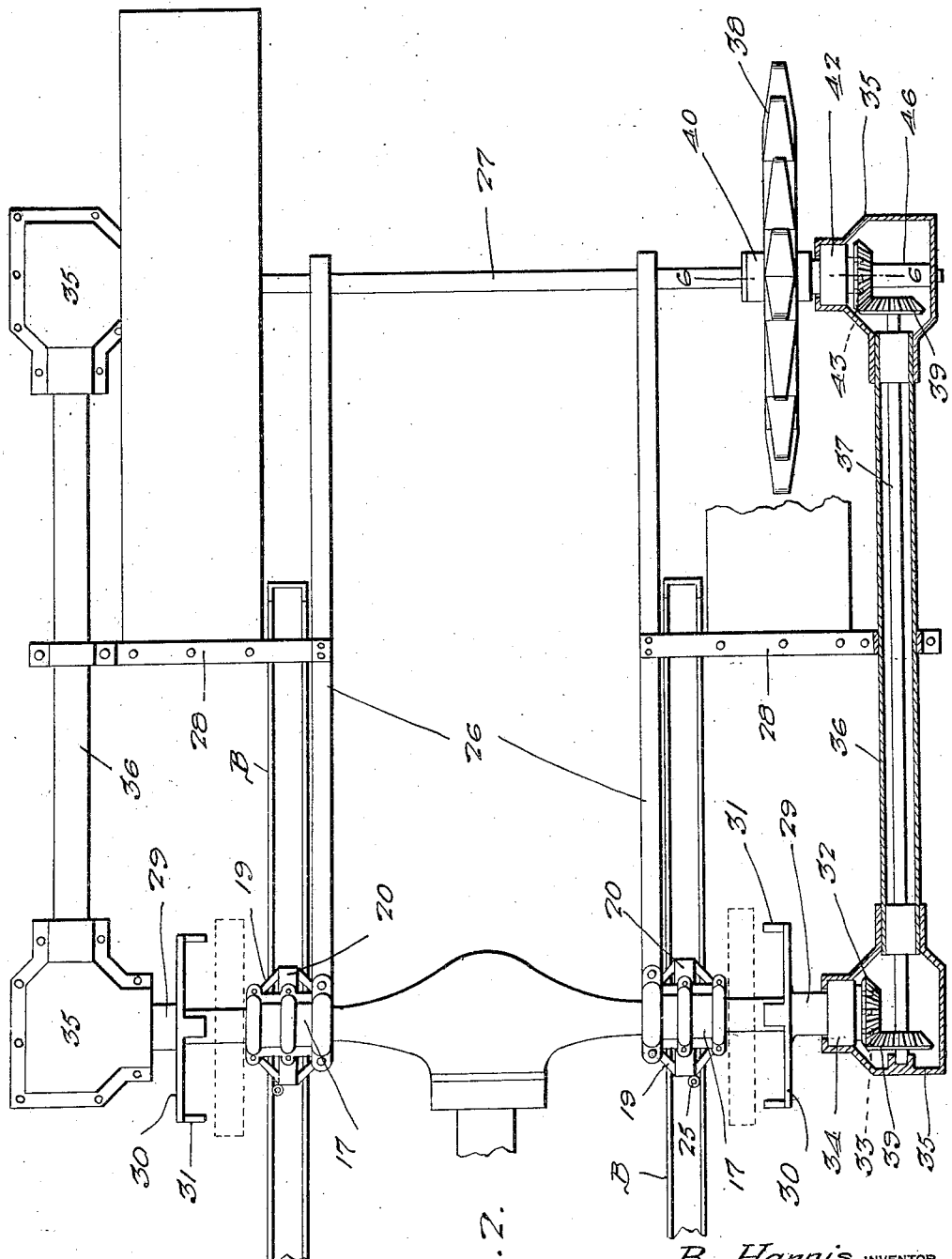

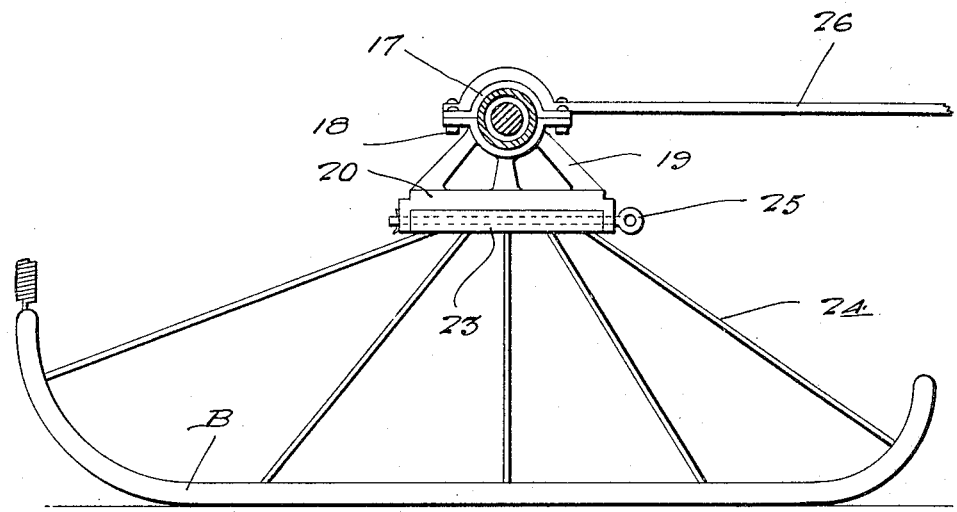
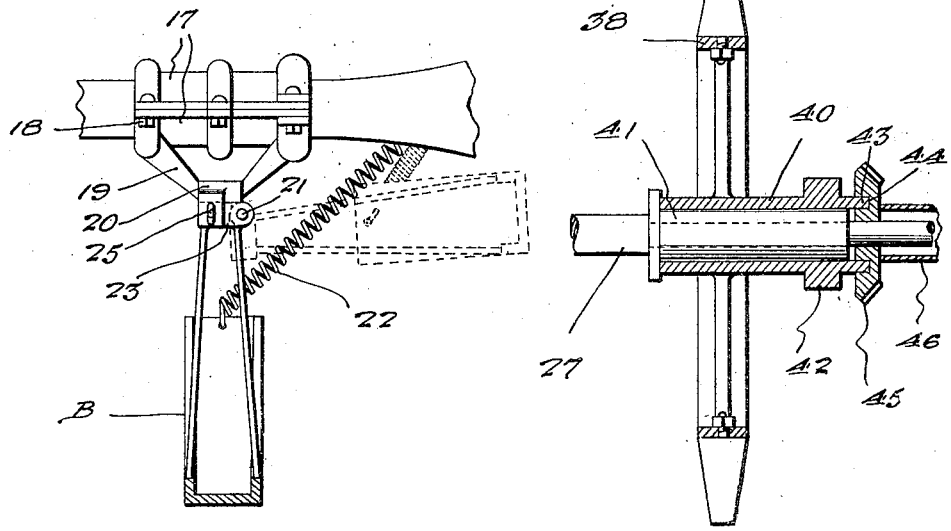

Patented Oct. 14, 1924.

1,511,331

UNITED STATES PATENT OFFICE.

RALPH HARRIS, OF SPRINGFIELD, MISSOURI.

MOTOR SLEIGH.

Application filed December 2, 1922. Serial No. 604,525.

*To all whom it may concern:*

Be it known that I, RALPH HARRIS, a citizen of the United States, residing at Springfield, in the county of Greene and State of Missouri, have invented new and useful Improvements in Motor Sleighs, of which the following is a specification.

This invention relates to motor operated sleighs, and contemplates the provision of a motor vehicle attachment, which can be quickly and conveniently associated with the vehicle to convert the latter into a sleigh.

More specifically stated, the invention provides a pair of front and rear runners, the former being designed for association with the front wheels of a vehicle, and the latter having association with the rear axle in a manner to permit the latter mentioned runners to be swung upwardly beneath the vehicle when not in use, the sleigh being propelled by means of ground engaging wheels supported at the rear of the vehicle and actuated by the driving mechanism thereof.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and Figure 1 is a side elevation of the vehicle equipped with the attachment for the purpose above stated.

Figure 2 is a plan view of that portion of the attachment arranged at the rear of the vehicle and associated with the rear axle.

Figure 3 is a view of the rod for connecting the front runners together.

Figure 4 is a view of one of the rear runners showing the manner of associating the same with the rear axle.

Figure 5 is a fragmentary view taken at a right angle to Figure 4 showing the manner in which the runner is capable of being swung upwardly.

Figure 6 is a sectional view taken on the lines 6—6 of Figure 2.

Figure 7 is a plan view of one of the front runners.

Figure 8 is a detail view of the sleeve designed for association with the rear wheel of the vehicle.

Figure 9 is a detail view of one of the clamps for associating the front runners with the spokes of the adjacent wheel.

Figure 10 is an elevation of one of the elements employed in the invention.

Referring to the drawings in detail A indicates generally a motor operated vehicle, which in accordance with the present invention can be easily and quickly converted into a sleigh and for which purpose I make use of front and rear runners as shown. The front runners are indicated at 10 and are arranged beneath the front wheels of the vehicle and held associated by means of a two part clamp 11 which embraces the hub of the wheel as illustrated in Figure 1. Each runner includes a plurality of spokes or the like indicated at 12, which radiate from one part of the clamp above referred to. These spokes are arranged in pairs, and connecting each pair is a transverse member 13 which carries a tire embracing member 14 as shown. Each spoke further supports a clamp 15 which is designed to engage the adjacent spoke of the vehicle wheel with which the runner is attached. The runners are at the front of the vehicle and connected by a transversely disposed rod 16, the terminals of which have ball and socket connections with the respective runners, so that both of the runners are turned in unison for the purpose of steering the sleigh.

The rear runners are indicated at B and adapted to be supported upon the rear axle in a manner to be presently described. For this purpose I equip the axle with spaced clamps, each clamp including separable parts 17 which are bolted or otherwise suitably secured together at 18. Projecting from the lower part of each clamp is a plurality of divergently disposed arms 19 which support a block like member 20 to which the adjacent runner B is pivoted. The runner is pivoted as at 21, so it can be arranged in a horizontal position beneath the body of the vehicle when not in use, as illustrated by dotted lines in Figure 5, a spring 22 being utilized to move the runners to the position mentioned, when the runner is released from the block like member 20. The member 20 is recessed to receive the portion 23 carried by the spokes 24 of the runner, when the latter is in a vertical position, and this portion 23 is provided with a bore which receives a locking pin 25 passed through openings in the end of the block member 20, and utilized to hold the runners in a vertical position for use against the tension of the spring 22. The construction of the clamps which support the runners, and which embrace the rear axle for this purpose, permits the clamps and the runners in their entirety to be quickly attached to or removed from the rear axle as the occasion may require. The clamps just referred to further support a frame which includes spaced parallel members 26 the latter projecting rearwardly from the axle, and connected together by a cross member 27 as clearly illustrated in Figure 2. Projecting laterally from the parallel members 26 of the frame, at a point intermediate their ends are extensions 28 which are utilized to assist in supporting the housings from the driving connection between the rear wheels of the vehicle and the ground engaging wheels supported by the frame, and utilized to propel the sleigh.

This driving connection is the same at both sides of the vehicle, and a brief description of one mechanism will suffice for both. I provide a sleeve 29 for the hub of each rear wheel, and this sleeve is slipped on the hub subsequent to the removal of the hub caps and the nuts off the adjacent end of the axle. The sleeve 29 is formed with a large annular flange 30, arranged on that end of the sleeve adjacent the wheel C, and projecting inwardly from this flange are spaced lugs 31 which are adapted to be positioned between the spokes of the wheel. Thus the sleeve is rotated incident to the rotation of the wheel, the sleeve being associated with a bevel gear 32 which is slipped on the end of the axle of the vehicle. This gear is provided with openings arranged to receive the projections 33, which extend from the outer end of the sleeve. A roller bearing indicated at 34 surrounds the sleeve and is positioned in the adjacent end of the housing, which end is indicated at 35. It will be noted that the housing embodies spaced end portions 35 of similar construction and these end portions are connected together by the tubular portion of the housing indicated at 36, these tubular portions being supported by the extensions 28 of the frame above referred to. The tubular portion houses the shaft 37 which provides a driving connection between the rear axle of the vehicle and the ground engaging wheel 38 supported by the transverse member 27 of said frame. This shaft 37 supports on each end a bevel gear 39, one of which meshes with the gear 32 associated with the rear axle, so that motion is imparted to the shaft 37 from the rear axle.

The ground engaging wheel 38 is supported by a hub 40 which surrounds a bearing 41 which is carried by the adjacent end of the transverse member 27 of the frame above referred to. This hub is provided with an enlarged portion 42 adjacent one end thereof which portion is positioned in the adjacent end portion 35 of the housing. This end of the hub is provided with projections 43 which are received by openings 44 provided in the bevel gear 45, this gear meshing with the adjacent gear 39 fixed to the shaft 37. Arranged within the housing 35 and surrounding the adjacent end of the transverse member 27 is a sleeve 46 one end of which bears against the outer wall of the housing, while the other end bears against the gear 45 to assist in holding the latter operatively associated with the hub 40 of the ground engaging wheel. It is manifest, that when the shaft 37 is rotated incident to the rotation of the rear axle, such motion is imparted to the hub 40 of the ground engaging wheels 38, and as these wheels are rotated the sleeve is moved over the surface.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim is:

1. The combination with a horizontally arranged supporting element, of a clamp detachably associated therewith, pairs of divergent arms carried by the clamp, a rectangular element carried thereby and provided with ears at one end, a sleigh runner, a plurality of brace rods carried thereby, a sleeve carried by the upper ends of the brace rods and hingedly connected with the ears, the runner being capable of being swung to a horizontal position to lie parallel to the supporting element when not in use.

2. The combination with a horizontally arranged supporting element, of a clamp detachably associated therewith, pairs of divergent arms carried by the clamp, a rectangular element carried thereby and provided with ears at one end, a sleigh runner, a plurality of brace rods carried thereby, a sleeve carried by the upper ends of the brace rods and hingedly connected with the ears, the runner being capable of being swung to a horizontal position to lie parallel to the supporting element when not in use, and a contractile spring having one end connected to the supporting element and its opposite end connected to the sleigh runner and adapted to hold the latter in such horizontal position.

In testimony whereof I affix my signature.

RALPH HARRIS.